Dec. 24, 1946.     W. P. WILLS     2,413,128
MEASURING AND CONTROL APPARATUS
Filed April 23, 1942     3 Sheets-Sheet 1

INVENTOR
WALTER P. WILLS
BY *C. B. Spangenberg*
ATTORNEY

Dec. 24, 1946.  W. P. WILLS  2,413,128
MEASURING AND CONTROL APPARATUS
Filed April 23, 1942  3 Sheets-Sheet 2

INVENTOR
WALTER P. WILLS
BY
ATTORNEY

Dec. 24, 1946.　　　　W. P. WILLS　　　　2,413,128
MEASURING AND CONTROL APPARATUS
Filed April 23, 1942　　　3 Sheets-Sheet 3

INVENTOR
WALTER P. WILLS
BY G. B. Spangenberg
ATTORNEY

Patented Dec. 24, 1946

2,413,128

UNITED STATES PATENT OFFICE

2,413,128

MEASURING AND CONTROL APPARATUS

Walter P. Wills, Philadelphia, Pa., assignor to The Brown Instrument Company, Philadelphia, Pa., a corporation of Pennsylvania Application April 23, 1942, Serial No. 440,163

20 Claims. (Cl. 236—15)

The general object of the present invention is to provide improved measuring and control apparatus adapted to take account of and give effect to the rate of change of a quantity measured or controlled. While not limited to such use, the invention may be used with especial advantage in many industrial heating processes in which a close regulation of a furnace or work temperature is desirable, and in which the corrective variation in the furnace heat supply made on a change in the controlling temperature should be suitably related to the rate of change in, as well as to the magnitude of the controlling temperature, if objectionable hunting is to be avoided.

The present invention is adapted for use in measuring, and in producing control effects in sole response to a rate of change, but in many cases the invention is advantageously used in conjointly measuring and producing control effects in accordance with the conjoint values of the magnitude and the rate of change of a controlling quantity or quantities.

A specific object of the present invention is to provide a novel temperature responsive element including a thermocouple, a condenser and resistance, combined to create a potential difference between the terminals of the element which is a measure of the rate of change of the temperature of the thermocouple.

Another specific object of the invention is to combine a thermocouple, a condenser and resistance in a potentiometric measuring circuit including rebalancing means, in such manner that a potential difference which is a measure of the rate of change of the temperature of the thermocouple can be measured by the null method.

Another specific object of the invention is to combine thermocouple means, a condenser and resistance into an element responsive both to the temperature of the thermocouple means and the rate of change of that temperature. In one form the last mentioned element includes but a single thermocouple, while in another form it includes two thermocouples.

Further specific objects of my invention are to provide novel and useful apparatus for conjointly measuring the temperature and a temperature rate of change, and for producing control actions in selective accordance with such measurements.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described various embodiments of my inventions.

Figure 1:
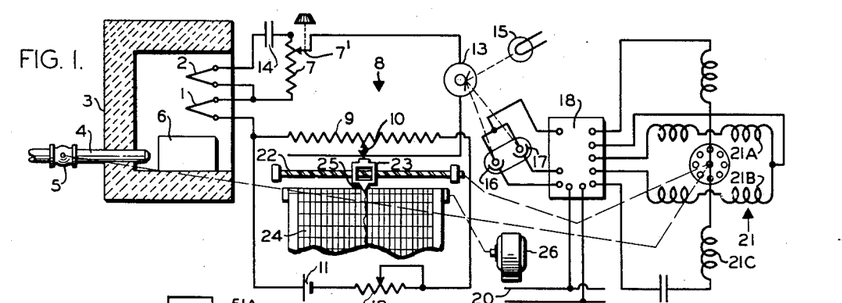
Fig. 1 is a diagrammatic representation of one embodiment of the invention.

Fig. 1 diagrammatically illustrates the use of a form of the present invention in which two thermocouples 1 and 2, extending into the heating chamber of a work heating furnace 3 are associated with measuring and control apparatus employed to regulate the rate of heat supplied to the furnace by adjustment of a valve 5 in the furnace fuel supply pipe 4 in joint response to a furnace temperature and a furnace temperature rate of change, as required for the proper heating of work 6 in the furnace chamber.

As shown, the thermocouple 1 of Fig. 1 is connected in series with a resistance 7 in the potentiometric measuring circuit of a self-balancing potentiometer instrument 8. The potentiometric measuring circuit includes a slide wire 9, a contact 10 in engagement with, and adjustable longitudinally along the slide wire 9, an energizing battery 11, and a resistance 12 adjustable to insure the desired potential drop in the slide wire. The thermocouple 1 has one terminal connected through the resistance 7 and a mirror type galvanometer 13 to the contact 10. The thermocouple 2 has one terminal directly connected to one terminal of the resistance 7 and has its second terminal connected through a condenser 14 to the second terminal of the resistance 7.

After the temperature of the thermocouple 2 has been constant long enough for its potential and that of the condenser 14 to equalize, the condenser 14 prevents the thermocouple 2 from having any effect on the current flow through the galvanometer 13. However, on a change in the temperature to which the thermocouple 2 is subjected, the corresponding increase or decrease in its potential results in the flow of a condenser charging or condenser discharging current through the resistance 7, and the resultant change in the voltage drop in that resistance has the effect of temporarily adding to or subtracting from the voltage impressed by the thermocouple 1 on the circuit branch including the galvanometer 13.

The thermocouple 2, condenser 14 and the resistance 7 combine to form an element creating a potential difference which is a measure of the rate of change of the temperature of the thermocouple. Furthermore, the last mentioned element is combined with the thermocouple 1 to form a second element creating a potential difference which is the algebraic sum of the E. M. F. created by the thermocouple 1, and the potential difference created by the first mentioned element. The proportion of the potential difference jointly created by the thermocouples 1 and 2 which is contributed by the thermocouple 2 may be varied as desired by the adjustment of contact 7, provided in slideable engagement with the resistance 7 and which permits tapping off a desired part of the potential drop across resistance 7. The potential difference which the two thermocouples 1 and 2 jointly create, is of a character to be measured by potentiometric means operating on the null principle and one form of such means is collectively shown by Figs. 1 and 2.

In Fig. 1, the mirror galvanometer 13 reflects light from a light source 15 onto photoelectric cells 16 and 17, which, as shown, are enclosed in a common envelope, and are connected to the input terminals of an electronic amplifier 18. The latter, shown in Fig. 2 and hereinafter described in detail, is energized from alternating current supply conductors 19 and 20, and has its output terminals connected to the terminals of a reversible motor 21.

When the potentiometric measuring circuit is balanced and the galvanometer 13 occupies its neutral or intermediate deflective position, equal amounts of light are reflected onto the cells 16 and 17, and the motor 21 is not energized for rotation in either direction and remains stationary. However, when the measuring circuit is unbalanced the galvanometer deflects out of its neutral position, and one of the cells 16 or 17 receives more light than the other. The motor 21 is then energized for rotation in a direction dependent on which cell receives the more light. The motor 21 is mechanically connected to and rotates the threaded pen carriage shaft 22 of the instrument 8 and thereby adjusts the pen carriage 23 longitudinally of said shaft. The pen carriage 23 carries the contact 10 which is moved by the carriage in the direction to rebalance the potentiometer circuit. The pen carriage also supports a recording pen 25 which traces a record of the pen carriage movement on a record strip or chart 24. When the potentiometer is balanced, the length of the portion of the slide wire 9 at the left of the contact 10 in Fig. 1 is such that the potential drop in said portion, due to the current flow produced by the battery 11, is equal in magnitude and opposite in direction to the potential impressed on said slide wire by the circuit branch including the thermocouple 1 and galvanometer 13.

On a subsequent increase or decrease in the furnace temperature, the potential impressed on the said slide wire portion by the said circuit branch is increased or decreased as a result of the increase in the voltage of the thermocouple 1, and is further increased or decreased as a result of the change in the voltage of the thermocouple 2 and the resultant change in the potential drop in the resistance 7 due to the flow of current charging or discharging the condenser 14. When the potentiometer is thus unbalanced, the motor 21 operates in the direction to move the contact 10 to the right or to the left as required to rebalance the potentiometer.

The increased or decreased voltage of the thermocouple 1, due to the above mentioned change in furnace temperature, is maintained until a further change in the furnace temperature occurs. If following its initial change, the furnace temperature remains constant for a period, the condenser charging or discharging current flow created by an initial change in the voltage of the thermocouple 2 will correspondingly vary the potential of the condenser 14 and die out. As the condenser current thus dies out, the portion of the potential drop in the resistance 7 created by the condenser current will also die out, and thus have the effect of producing a reverse potential rebalancing operation of the motor 21, and a return movement of the contact 10 into the position in which it correctly indicates the existing temperature of the thermocouple 1.

The motor 21 is operatively connected to the fuel valve 5 to give the latter an opening or closing adjustment, accordingly as the motor rotation is in the direction to adjust the contact 10 toward the left or low temperature end of its range of movement, or toward the opposite end of that range.

As will be apparent, the potential drop in the resistance 7 in one direction produced by a condenser charging current, or in the opposite direction produced by a condenser discharging current, is in each case proportional to the magnitude of the current and, hence, in each case is directly proportional to the rate of change in furnace temperature, and, as has been made apparent, on a change in the furnace temperature the thermocouple 2 of Fig. 1 operates to temporarily increase the corrective adjustment then produced by the thermocouple 1.

As is well known to those skilled in the control art, the production of corrective control effect immediately on a change in a control condition, followed by a delayed control effect opposite in direction to, but smaller in magnitude than the first effect, is conducive to close regulation with little or no hunting tendency, provided the two control effects are suitably proportioned with respect to the controlling condition change giving rise to those effects and to the characteristics of the furnace heating operation or other process in which the control effects are used. The provision of the adjustable contact 7, as shown, facilitates such proportioning of the two control effects.

For optimum results in the use of the invention in the form shown in Fig. 1, the values of the resistance 7 and of the condenser 14 should be suitably related to the operating characteristics of the furnace. The furnace characteristics which thus have to be taken into account depend upon such matters as the heat storage capacity of the furnace walls, the heat absorbing capacity of the work, and the furnace and work temperatures. Merely by way of illustration and example, I note that in one use of apparatus differing essentially from that shown in Fig. 1 only in that the instrument 8 is used to measure and record furnace temperature conditions without subjecting the furnace to corresponding control actions, the resistance 7 has a value of 200 ohms and the condenser 14 has a value of 4,000 mfd.

Figures 2, 5:
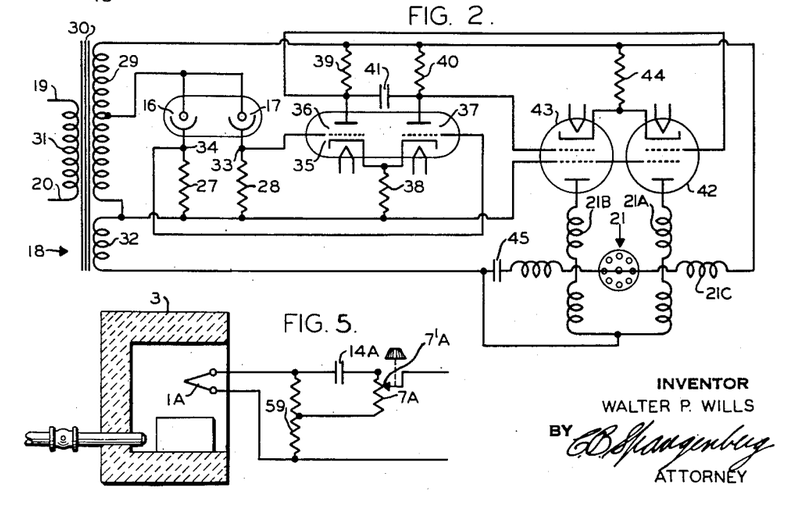
Fig. 2 is a diagrammatic representation of details of an electronic amplifier included in the apparatus shown in Fig. 1.
Fig. 5 diagrammatically illustrates a measuring element including a single thermocouple, a condenser and resistance combined to respond both to the temperature and to the rate of change of the temperature of the thermocouple.

The electronic amplifier 18 employed in the arrangement shown in Fig. 1 may take various forms, one suitable form being illustrated in Fig. 2. As shown in Fig. 2 the photocells 16 and 17 are connected in a bridge circuit, one branch of which includes the cell 16 and a resistance 27 while the other branch includes the cell 17 and a resistance 28. The bridge circuit receives energizing current from a section of the secondary winding 29 of a transformer 30, which has its primary winding 31 connected to and energized by alternating current supply conductors 19 and 20. The transformer also includes an additional secondary winding 32, the purpose of which is hereinafter explained.

The terminals or junctions 33 and 34 of the bridge circuit which normally have the same potential, are connected to the input circuit of an electronic valve 35 of the twin type including two triodes in one envelope. Thus, as shown, the bridge terminal 33 is connected to the control grid of the triode 36 and the terminal 34 is connected to the control grid of the triode 37. The cathodes of the two triodes are connected through a common biasing resistance 38 to the terminals of the resistances 27 and 28, respectively remote from the photoelectric cells 16 and 17. Plate energizing current is supplied to the triodes 36 and 37 by the transformer secondary winding 29. As shown, the plate circuit of the triode 36 includes a resistance 39 connecting the upper end of the winding 29 to the plate of the triode 36, and a connection including the resistance 38 between the cathode of triode 36 and the lower end of the secondary 29. The plate circuit for the triode 37 differs from that for the triode 36 only in that the plate of triode 37 is connected to the upper end of the transformer secondary 29 by a resistance 40. A condenser 41 of suitable value is connected between the ends of the resistances 39 and 40, respectively adjacent the plates of the triodes 36 and 37.

When the photocells 16 and 17 are equally illuminated, the triodes 36 and 37 will be equally conductive and the potential drop across the resistance 39 will be equal to that across the resistance 40. Upon an increase in the illumination of the photocell 16 relative to that of the photocell 17, the triode 37 will be rendered more conductive than the triode 36 and the potential drop across resistance 40 will then exceed that across resistance 39. Conversely, when the illumination of the photocell 17 exceeds that of the photocell 16, the potential drop across resistance 39 will exceed that across resistance 40.

The potential drop across the resistance 39 is impressed on the input circuit of an electronic valve 42, and the potential drop across the resistance 40 is impressed on the input circuit of an electronic valve 43. The valves 42 and 43 are shown as screen grid type tetrodes, receiving energizing current from the transformer secondary windings 29 and 32 which are connected in series so that their voltages are additive. As shown, the plate circuit of the tetrode 42 includes one winding 21A of the motor 21 through which the anode of the valve 42 is connected to the lower terminal of the secondary winding 32, and a cathode biasing resistance 44 connecting the cathode of the valve 42 to the upper end of the secondary winding 29. The plate circuit of the tube 43 includes the winding 21B of the motor 21 through which the anode of valve 43 is connected to the lower end of the secondary winding 32, and includes the resistance 44 through which the cathode of the valve 43 is connected to the upper end of the winding 29.

A third winding 21C of the motor is also energized from the transformer secondary windings 29 and 32 through a condenser 45 of suitable value. The motor windings 21A, 21B and 21C are so related and disposed that reaction between the magnetic fields produced by the windings 21A and 21C tends to produce rotation of the motor 21 in one direction, while the reaction between the magnetic fields produced by the windings 21B and 21C tends to rotate the motor in the opposite direction. In consequence, the motor 21 rotates in one direction or the other accordingly as the energization of the winding 21A exceeds or is less than that of the winding 21B, and the motor stalls when the windings 21A and 21B are similarly energized.

The plate circuits of the tubes 42 and 43 are connected across the transformer secondary windings 29 and 32 in a direction opposite to that in which the plate circuits of the triodes 36 and 37 are connected across the transformer secondary winding 29. In consequence, control of the conductivity of the tubes 42 and 43 in accordance with the potential drops across the resistance 39 and 40 is permitted because the condenser 41 holds over the potential drops produced across the resistances 39 and 40 in one-half cycle when the triodes 36 and 37 are conductive, to the next half cycle when the tubes 42 and 43 are conductive.

Upon an increase in the potential drop across the resistance 39 relative to that across the resistance 40, the tube 43 will be rendered more conductive than the tube 42, and the energizing current in the motor winding 21B will then exceed that in the motor winding 21A, and the motor 21 will rotate in one direction. Conversely, upon an increase in the potential drop across the resistance 40 relative to that across the resistance 39, the tube 42 will become more conductive than the tube 43, the energization of the motor winding 21A will exceed that of the winding 21B and the motor 21 will rotate in the opposite direction.

Figure 3:
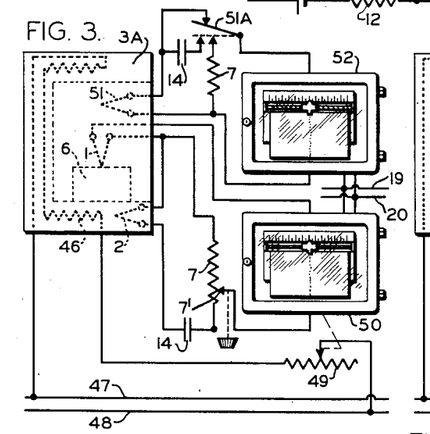
Fig. 3 is a diagrammatic representation of a modified form of embodiment of the invention.

Fig. 3 discloses a modification of the temperature control system shown in Fig. 1, comprising an electric furnace 3A heated by a resistor 46. Energizing current is supplied to the resistor 46 from alternating current supply lines 47 and 48 through a rheostat 49, adjusted by a self-balancing potentiometer recording and control instrument 50. The latter may be identical with the instrument shown in Fig. 1, and in such case the motor of the instrument 50 corresponding to the motor 21 of Fig. 1 is employed to adjust the switch arm of the rheostat 49 and thereby increase or decrease the heat supply to the furnace 3A, as the heat supply to the furnace 3 of Fig. 1 is increased and decreased by suitable adjustment of the fuel valve.

The instrument 50 of Fig. 3 is associated with thermocouples 1 and 2 exactly as is the instrument 8 of Fig. 1, but in Fig. 3 the thermocouple 1 is so located as to closely follow the temperature variations in the work object 6 being heated in the furnace 3A, while the thermocouple 2 is so disposed as to respond to changes in the temperature of a portion of the furnace wall closely adjacent the heating resistance 46.

The control system including the instrument 50 and the thermocouples 1 and 2 of Fig. 3, is thus adapted to supplement a primary regulation in accordance with the temperature of the work object 6 by a secondary regulation due to furnace wall temperature changes, varying in magnitude with the rate of said temperature changes. The more or less intermittent control action effected by the thermocouple 2, is anticipatory of the effect on the work temperature of a change in the furnace wall temperature, and thus minimizes the tendency of the work temperature to overshoot the desired value first in one direction and then in the opposite direction.

The arrangement shown in Fig. 3 includes in addition to the measuring and control instrument 50 and associated instrumentalities, a third furnace temperature responsive thermocouple 51 and an instrument 52 for measuring and recording either the temperature of the thermocouple 51, or the changes and rates of change in the temperature of the thermocouple 51 depending on the adjustment of a switch 51A. The instrument 52 may be a self-balancing potentiometric measuring and recording instrument exactly like the instrument 8 of Fig. 1. When the switch 51A is in its position shown in dotted lines in Fig. 3, the thermocouple 51 has its terminals connected in series with a resistance 7 to a terminal of a condenser 14, and in conjunction with that resistance and condenser, is associated with the potentiometric circuit of the instrument 52, exactly as the thermocouples 1 and 2 are collectively associated with the measuring circuit of the instrument 8 of Fig. 1 and the instrument 52 then measures and records the changes and rates of change of the temperature of the thermocouple 51. When the switch 51A is in its full line position shown in Fig. 3, the thermocouple 51 is connected to the measuring circuit of the instrument 52 so that the latter will then measure and continuously record the temperature of that thermocouple.

Figure 4:
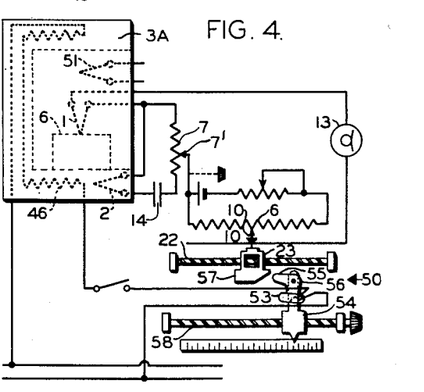
Fig. 4 is a diagram illustrating a modification of a portion of the apparatus shown in Fig. 3.

Fig. 4 illustrates a modification of the apparatus shown in Fig. 3, in which the instrument 50 directly controls the opening and closure of the energizing circuit for the furnace heating resistor 46 instead of controlling a rheostat in that circuit. The modification shown in Fig. 4 thus provides an "on and off" control, instead of the graduated control effected in Fig. 3 by adjustment of the rheostat 49. In Fig. 4 a mercury switch 53 is carried by a bell crank 55 pivoted at 56 to a control table 54, and is so disposed that a cam 57 carried by the pen carriage 23 of the instrument 50 will tilt the mercury switch in one direction or permit it to tilt in the opposite direction under a gravitational bias force. As the pen carriage 23 moves to the right on increase in the furnace temperature above the value which the apparatus is adjusted to maintain the switch 53 is tilted in one direction and opens the energizing circuit for the furnace heating resistor 46, and that circuit is closed when the switch is tilted in the opposite direction on a return movement of the pen carriage to the left.

The "control point," or temperature which the instrument 50 of Fig. 4 tends to maintain, may be varied by adjusting the control table 54 in a direction parallel to the path of the movement of the pen carriage 23. To this end, the control table 54 is shown in threaded engagement with a manually rotatable shaft 58.

Measuring and control effects of the kind obtainable with the two thermocouples of Fig. 1, can be obtained with a single thermocouple of the character shown in Fig. 5. The single thermocouple 1A of Fig. 5 has its two terminals directly connected to a resistance 59, and has one terminal connected to one terminal of a condenser 14A. The second terminal of the condenser 14A is connected by a resistance 7A to the midpoint of the resistance 59.

The thermocouple 1A and condenser 14A of Fig. 5 may be connected in series with a galvanometer to a potentiometric measuring circuit as the thermocouples 1 and 2, condenser 14 and galvanometer 13 are connected in Fig. 1. In the arrangement shown in Fig. 5, the resistance 59 acts as a voltage divider, which through the resistance 7A, impresses the voltage drop in its lower half on the potentiometric measuring circuit. That voltage drop is normally equal to half of the voltage of the thermocouple 1A. On a change in the temperature of the thermocouple 1A, the current then charging or discharging the condenser 14A produces a voltage drop in the resistance 7A which is a measure of the rate of change of the temperature of the thermocouple 1A, and a desired portion of which may be tapped off by adjustment of contact 7'A along the resistance 7A.

Figure 6:
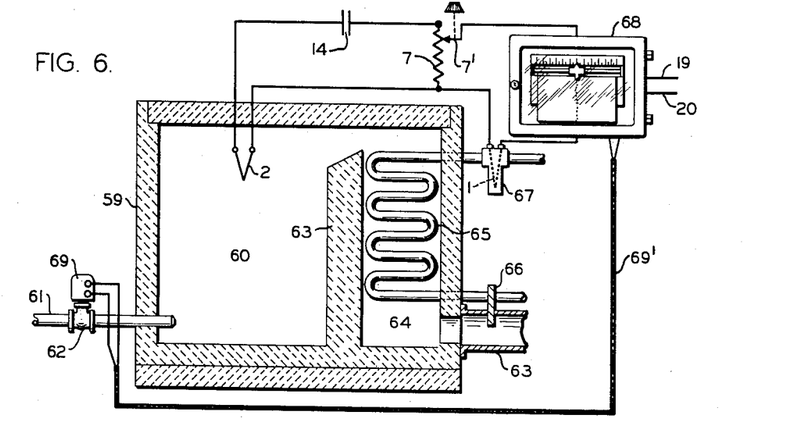
Fig. 6 is a diagrammatic representation of a fluid heating system including provisions for measuring and controlling in joint response to the temperature of the fluid heated and to the rate of change in a furnace temperature.

In Fig. 6 I have illustrated the use of control apparatus of the character shown in Fig. 1 to control the supply of fuel to the combustion chamber of a tubular oil heater in primary response to the exit oil temperature, and to modify the primary control in accordance with the rate of changes occurring in the combustion chamber temperature. The tubular oil heater shown in Fig. 6 is of well known type and form, comprising a combustion chamber 60 to which fuel is supplied through a pipe 61 at a rate dependent on the adjustment of a fuel valve 62. The combustion chamber 60 is separated by a bridge wall 63 from a chamber 64 containing a bank of tubes 65 through which flows the oil being heated. The heater draft is controlled by a stack damper 66.

In Fig. 6, the thermocouple 1 is mounted in a thermometer well 67 in the pipe through which the heated oil passes away from the tube bank 65, and the thermocouple 2 extends into the combustion chamber 60. The thermocouples 1 and 2 are connected to each other and to a measuring and control instrument 68 as the thermocouples 1 and 2 are connected to one another and to the instrument 8 in Fig. 1. The instrument 68 may be identical with the instrument 8 of Fig. 1, and the valve 62 may be adjusted by the reversible motor of the instrument 68, as the valve 5 of Fig. 1 is adjusted by the motor 21. As shown, however, the valve 62 is adjusted by an individual motor 69 which may be controlled by the instrument 68 in any usual manner in which a self-balancing potentiometer controls a motor. In particular, the motor 69 and the motor of the instrument 68 may each be like the motor 21 of Fig. 2, and the motor 69 may be connected in parallel with the motor of the instrument 68 by conductors included in a cable 69'.

As will be apparent, on an increase or decrease in the temperature of the combustion chamber 60, the thermocouple 2 will temporarily increase or decrease the voltage impressed on the instrument 68, and the latter will thereby subject the fuel valve 62 to a corrective adjustment in advance of the increase or decrease in the exit oil temperature which the increase or decrease in the combustion chamber temperature tends to produce. The effect of this anticipatory control is to substantially minimize the delayed variations in the exit oil temperature produced by variations in the combustion chamber temperature.

Figures 7, 7A:
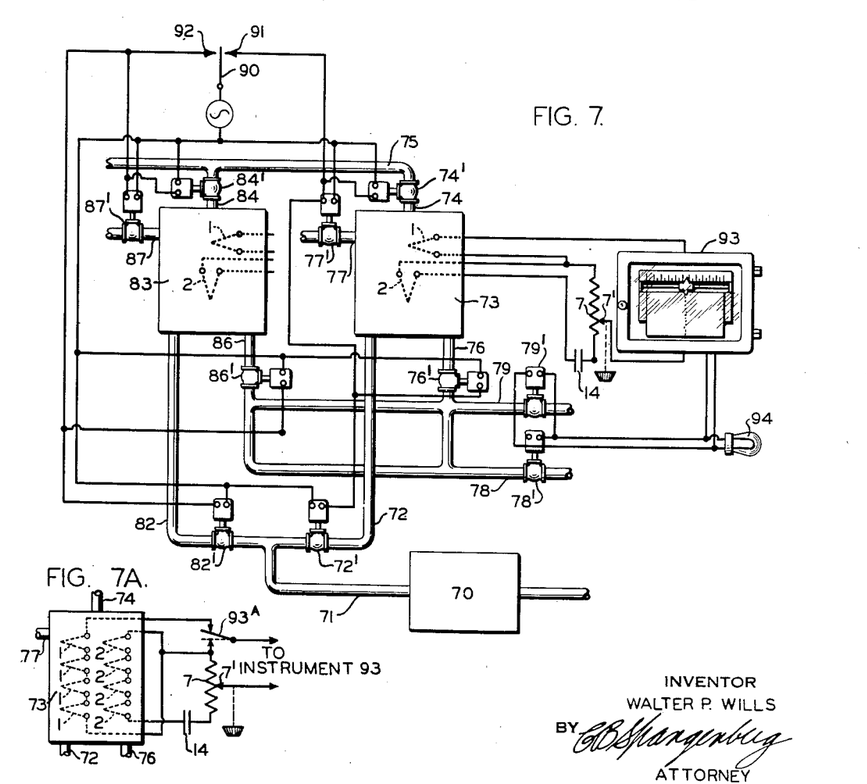
Fig. 7 diagrammatically illustrates the use of a form of the invention in which the regeneration of catalytic material is controlled in automatic response to temperature variations and the rates of such variations.
Fig. 7A illustrates a modification of Fig. 7.

In Fig. 7 I have diagrammatically illustrated the use of the present invention in controlling the regeneration of catalytic material employed in an industrial process in which the periodical regeneration of the catalytic material comprises a heating action tending to increase the temperature of said catalytic material and comprises a catalytic cooling action preventing an objectionable increase in the temperature of the catalytic material. The apparatus shown in Fig. 7 is adapted for use in a known refining process in which petroleum vapors at a temperature of 840° or so, are moved over catalytic material during working periods which alternate with regeneration periods, and during regeneration periods, hot air is moved over the catalytic material to burn away carbon deposited thereon during the working periods, and steam is moved over the catalytic material to prevent the increase in its temperature which the hot air treatment tends to produce.

The apparatus shown diagrammatically in Fig. 7 comprises an oil vaporizing chamber 70 from which oil vapors pass through a pipe 71 and thence through one or the other of two branch pipes 72 and 82 into one or the other of two catalyzing chambers 73 and 83. In accordance with the customary practice, the oil vapors are passed alternately to the two chambers 73 and 83, and the catalytic material in each of those chambers is subjected to regeneration during the periods in which oil vapors are being subjected to the catalytic treatment in the other chamber. The catalyzed oil vapors pass from the chambers 73 and 83 through outlets 74 and 84, respectively, to a delivery pipe 75. During the regeneration periods hot air and steam are passed into the chamber 73 through a pipe 76 and pass away from the chamber 73 through its vent outlet 77. The air then passed into the chamber 73 is supplied by a pipe 78, while the steam passed into the chamber is supplied by a pipe 79. The pipes 78 and 79 also serve during the regeneration of catalytic material in the chamber 83, to supply air and steam to that chamber through its inlet pipe 86 and the chamber 83 then vents through its outlet 87.

As the oil treating and regeneration periods are ordinarily each of a few minutes duration only, the various pipes 72, 74, 76, 77, 82, 84, 86 and 87 are advantageously provided with suitable quick acting solenoid valves 72', 74', 76', 77', 82', 84', 86' and 87', respectively. As shown, said valves are adapted for operation in suitably timed relation by the adjustment of a single pole double throw switch 90 between positions in which it respectively engages spaced apart contacts 91 and 92. When the switch 90 is moved into engagement with the contact 91 it opens the valves 72' and 74' and closes the valves 76' and 77', and when moved out of engagement with the contact 91 it effects closures of the valves 72' and 74' and the opening of the valves 76' and 77'. When the switch 90 is moved into engagement with the contact 92 it similarly opens the valves 82' and 84', and it closes the valves 86' and 87' and when moved out of engagement with the contact 92 it opens the two valves last mentioned and closes the valves 82' and 84'.

The same cyclic operations are effected in the chambers 73 and 83. The opening and closure of a solenoid valve 78' in the hot air supply pipe 78 respectively permits and prevents hot air from passing through whichever of the valves 76' and 78' may then be open. Similarly, the opening and closure of a solenoid valve 79' in the steam supply pipe 79 permits or prevents the passage of steam from said pipe through whichever of the valves 76' and 86' is then open. In the regeneration of the chamber 73, the hot air supply valve 78' is open and the steam supply valve 79' is closed during periods in which the temperature in the chamber 73 is suitably low, but on a sufficient increase in the temperature in the chamber 73, an instrument 93, responsive to the temperature in the chamber 73 and to the rate at which that temperature changes, closes the valve 78' and opens the valve 79', so that the interruption in the hot air supply and the initiation of the supply of steam to the chamber 73 will prevent objectionable overheating of the catalytic material in that chamber.

In the arrangement diagrammatically shown in Fig. 7, the instrument 93 is connected to thermocouples 1 and 2 as is the instrument 8 of Fig. 1, and valves 78' and 79' are biased to open and closed positions, respectively, when their solenoid coils are energized. To this end, the solenoid coils of the two valves are connected in parallel in an energizing circuit which is closed by the instrument 93 in any suitable manner on a predetermined movement of the pen carriage toward the high temperature end of its range of movement. For example, said energizing circuit may be closed by a mercury switch like the switch 53 of the instrument 50 of Fig. 4.

The thermocouples 1 and 2 in the chamber 83 may be connected to the instrument 93 during the regeneration of the chamber 83, or they may be connected to a separate but similar control instrument through which the energization of the valves 78' and 79' are controlled by the temperature conditions in the chamber 83. In lieu of a single thermocouple 1 in each of the chambers 73 and 83 there may be a plurality of such thermocouples collectively providing an average of the temperatures at a plurality of points in each chamber. Similarly, there may be a plurality of thermocouples 2 in each chamber to collectively respond to the rate of change of the temperatures at a plurality of points in the chamber.

In Fig. 7A I have illustrated, more or less diagrammatically, such modification of Fig. 7. As shown in Fig. 7 the thermocouples 1 may desirably be connected in series with each other, and similarly, the thermocouples 2 may also be connected in series with each other. The modification of Fig. 7A also incorporates provisions for selectively connecting either the thermocouples 2 alone to the instrument 93 or for connecting both the thermocouples 1 and 2 to the instrument 93. These provisions comprise a single pole-double throw switch 93A which in its dotted line position connects only the thermocouples 2 to the instrument 93, and which in its full line position connects both the thermocouples 1 and 2 to the instrument 93. When the switch 93A is in its dotted line position, the instrument 93 provides a record of and operates to effect a control action in response to the rate of change of the temperatures at a plurality of points in the chamber 73 independently of the actual magnitudes of those temperatures. When the apparatus is so employed, the instrument 93 is preferably of the type which is adapted to assume a center or intermediate position when the applied voltage under measurement is zero, and by way of illustration, may be like the instrument 98 shown in Fig. 8 and described in connection therewith. With the switch 93A in its full line position the instrument 93 provides a record of and operates to effect a control action in joint response to the rate of change of temperature at a plurality of points in the chamber 73 and the average magnitude of the temperature at a plurality of points within the chamber 73. It will be understood that the plurality of points in the chamber 73 to the temperature of which the thermocouples 1 respond may be the same points to changes in the temperature of which the thermocouples 2 respond, or, if desired, those points may be different points as shown.

As shown in Fig. 7 a lamp or other signal 94 is connected in parallel with the solenoid windings of the valve 78' and 79' so that the signal device will indicate the temperature condition in the chamber undergoing regeneration which causes the hot air supply valve 78' to close and the steam valve 79' to open.

The steam supplied by the pipe 79 may be at a temperature of the same order as the temperature of the hot air supplied by the pipe 78. Even if the steam supplied is at the same temperature as the hot air, the interruption of the hot air supply and the initiation of the steam supply to a chamber undergoing regeneration, will prevent further increases in temperature in that chamber and ordinarily will effect a reduction in the temperature in that chamber, since the reaction of the hot air with hot carbon is exothermic, while the reaction of the superheated steam with hot carbon is endothermic. In the regeneration of catalytic material in apparatus of the character diagrammatically shown in Fig. 7, the temperature of the catalytic material may increase in a very few minutes from a normal working temperature of 840° or so, to a maximum safe regeneration temperature in excess of 1100°. Because of the rapid and substantial changes in catalyst temperature and the importance of limiting the rise in the catalyst temperature, control apparatus which takes into account not only the temperature, but also the rate of temperature change in the chamber undergoing regeneration is especially desirable.

Figure 8:
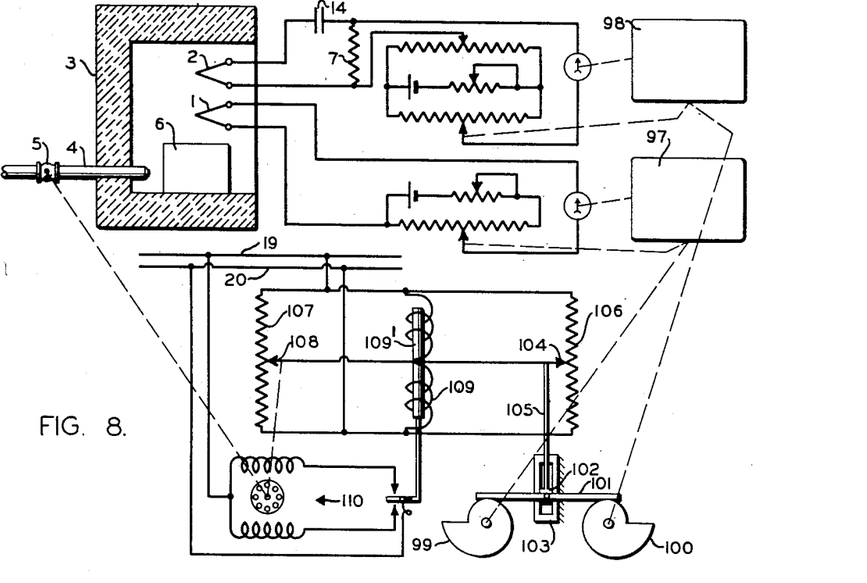
Fig. 8 diagrammatically illustrates an arrangement for separately measuring a furnace temperature and a furnace temperature rate of change and means for controlling the furnace heat supply in joint response to the two measurements.

In Fig. 8 I have illustrated an embodiment of my invention in which the supply of fuel to a furnace 3 may be varied just as it is in Fig. 1, in accordance with voltage changes in a thermocouple 1 providing a measure of the temperature in the furnace and in a thermocouple 2 providing a measure of the rate of furnace chamber temperature change. In Fig. 8, however, the thermocouples 1 and 2 are not electrically connected for conjoint operation in a single measuring and control circuit, but are connected to separate control instruments which mechanically cooperate to produce conjoint control actions. Thus, in Fig. 8, the thermocouple 1 is connected to the measuring circuit of a self-balancing potentiometric instrument 97 which may be exactly like the instrument 8 of Fig. 1, and the thermocouple 2 and its associated condenser 14 and resistance 7 are connected to the measuring circuit of a self-balancing potentiometric instrument 98 which also may be exactly like the instrument 97. As diagrammatically shown in Fig. 8, however, the potentiometric circuit of instrument 97 is of one well known type while the potentiometric circuit of the instrument 98 is of a different but equally well known type, which, for the purposes of the present invention is the full equivalent of the circuit of the instrument 97.

In the form of the invention shown in Fig. 8 the thermocouples 1 and 2 conjointly control the adjustment of the fuel valve 5 for the furnace 3 through mechanism mechanically adjusted by the instruments 97 and 98. As shown, the instrument 97 angularly adjusts a cam 99 in one direction, for example, the counter-clockwise direction, on an increase in the temperature of the thermocouple 1, and adjusts cam 99 in the clockwise direction on a decrease in the furnace temperature. With the instrument 97 thus rotating the cam 99 as assumed above, the instrument 98 will angularly adjust a cam 100 in the clockwise direction on an increase in the temperature of the thermocouple 2 to an extent dependent on the magnitude of the rate of temperature increase. Similarly, on a decrease in the temperature of thermocouple 2, the instrument 98 will give a counter-clockwise adjustment to the cam 100, the magnitude of which will depend upon the rate of change of the temperature of the thermocouple 2.

The cams 99 and 100 act upon the opposite ends of a lever 101 to give longitudinal movement in a guide way 103 to a cross head 102 to which the lever 101 is pivoted. The movements thus given the cross head 102 are equal to the algebraic sum of the movements given the opposite ends of the lever by the cams 99 and 100.

The movements of the cross head 102 in the guide way 103 give proportional adjustments to the fuel valve 5 of Fig. 8 through electrical proportioning system apparatus of a well-known and widely used type. Said apparatus comprises a bridge circuit including two slide wire resistors 106 and 107 and a solenoid winding 109 all connected in parallel between the supply conductors 19 and 20. The movement of cross head 102 in the guide way 103 operates through a link 105 to give movement to a slider contact 104 along the resistor 106. The contact 104 is connected to the midpoint of the solenoid winding 109 and to a slider contact 108 in engagement with the resistor 107. When the contact 104 is adjusted along the resistor 106 it unbalances the normally equal currents flowing through the upper and lower halves of the winding 109, and thus gives movement axially of the winding 109 to its armature 109'. The movement thus given to the armature 109' adjusts the energizing switch of a reversible motor 110 for operation to adjust the slider contact 108 along the resistor 107 in the direction and to the extent required to rebalance the bridge and thus equalize the current flows in the upper and lower halves of the winding 109. The movement of the contact 108 required to thus rebalance the bridge is directly proportional in extent to the movement of the slider contact 104 which started the motor 110 into operation. The motor 110 is connected to the fuel valve 5 and gives the latter an adjustment proportional in extent to the adjustment given the contact 108.

Figure 9:
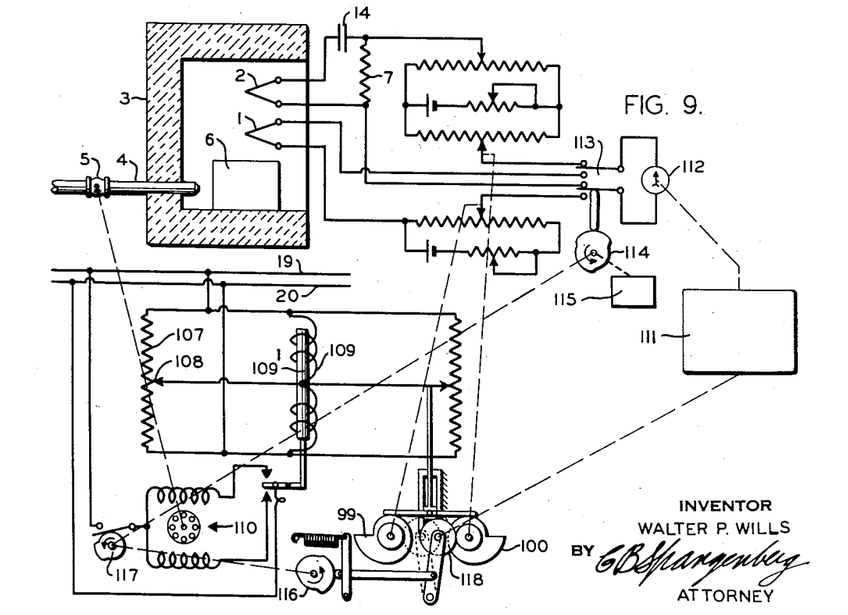
Fig. 9 diagrammatically illustrates a modification of the arrangement shown in Fig. 8.

An alternative arrangement for mechanically combining control effects separately dependent on the temperatures of the thermocouples 1 and 2 in a furnace 3, is shown in Fig. 9. In Fig. 9 the thermocouples 1 and 2 are connected to separate potentiometer circuits like those shown in Fig. 8, but in Fig. 9 the two potentiometer circuits are automatically rebalanced by a single instrument 111, under the control of a galvanometer 112 connecting the thermocouple 1 to one bridge circuit, and connecting the element including the thermocouple 2, resistance 7 and condenser 14 to the other bridge circuit in regular alternation. The switch 113 is adjusted by the cam 114 of a timing mechanism 115 which also includes other timing cams 116 and 117. The cam 116 serves to bring a driving wheel 118 rotated by the motor of the reversible rebalancing motor of the instrument 111, alternately into driving engagement with the shafts respectively carrying the cams 99 and 100 in regular alternation, whereby said cams are alternately adjusted in accordance with the measurements alternately effected with the two potentiometer circuits.

Control actions dependent upon the algebraic sums of the angular adjustments given the cams 99 and 100 of Fig. 9, regulate the adjustment position of the fuel valve 5 of Fig. 9 exactly as the angular adjustments of the cams 99 and 100 regulate the adjustment of the valve 5 of Fig. 8. The timing cam 117 of Fig. 9 operates to open the energizing circuit of the motor 110, regardless of the position of the armature 109', during the periods in which driving wheel 118 is being shifted between its two operative positions. Novel subject-matter disclosed but not claimed herein, is claimed in my copending application for patent, Ser. No. 493,349, and other novel subject matter disclosed but not claimed herein, is claimed in my copending application, Ser. No. 493,350, each of said copending applications having been filed July 3, 1943, as a division of this application.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention, as set forth in the appended claims and that in some cases certain features of my invention may be used to advantage without a corresponding use of other features.

Having now described my invention, what I claim as new and desire to secure by Letters Patent is:

1. A control system for varying the supply of a condition varying agent to regulate the magnitude of a variable condition in primary response to the variations in magnitude of said variable condition and in secondary response to the variations in a second variable condition related to said first variable condition comprising voltage producing means to derive a voltage varying in correspondence with the variations in magnitude of said first variable condition, solely electrical reactance means having a substantial voltage modifying property connected in circuit with said voltage producing means to derive a voltage varying in correspondence with the rate of change of said second variable condition, and means controlled jointly by both of said voltages to vary the supply of condition varying agent to regulate the magnitude of said first variable condition.

2. A control system for varying the supply of a condition varying agent to regulate the magnitude of a variable condition in primary response to the variations in a variable condition and in secondary response to the variations in a second variable condition related to said first mentioned variable condition comprising a thermocouple arranged to respond to variations in said first mentioned variable condition to derive a voltage varying in correspondence with the variations in magnitude of said first mentioned variable condition, a second thermocouple arranged to respond to variations in said second mentioned variable condition, solely electrical reactance means having a substantial voltage modifying property connected in circuit with said second mentioned thermocouple to modify the voltage output of the latter as required to derive from said second thermocouple a voltage varying only according to the rate of change of said second variable condition, means responsive to the voltages derived from both of said thermocouples, and means controlled by said last mentioned means to vary the supply of condition varying agent to regulate the magnitude of said first variable condition.

3. A control system for varying the supply of a condition varying agent to regulate the magnitude of a variable condition in primary response to the variations in said variable condition and in secondary response to the variations in a second variable condition related to said first mentioned variable condition comprising a thermocouple arranged to respond to variations in said first variable condition to derive a voltage varying in correspondence with the variations in magnitude of said first mentioned variable condition, a second thermocouple arranged to respond to variations in said second mentioned variable condition and having one terminal connected to one terminal of the first mentioned thermocouple, a condenser having one terminal connected to the second terminal of said second thermocouple, a resistor connecting the second terminal of said condenser to the first terminal of said second thermocouple, means responsive to the voltage difference between the second terminal of the first thermocouple and the second terminal of the condenser, and means controlled by the last mentioned means to vary the supply of condition varying agent to regulate the magnitude of said first variable condition.

4. A control system for controlling the supply of fuel to the combustion chamber of an oil heater in primary response to the exit oil temperature and in secondary response to the rate of changes occurring in the combustion chamber temperature comprising a thermocouple arranged to respond to the variations in temperature of the exit oil temperature of said oil heater, a second thermocouple arranged to respond to the variations in temperature occurring in the combustion chamber and having one terminal connected to one terminal of the first mentioned thermocouple, a condenser having one terminal connected to the second terminal of said second thermocouple, a resistor connecting the second terminal of said condenser to the first terminal of said second thermocouple, means responsive to the voltage difference between the second terminal of the first thermocouple and the second terminal of said condenser, and means controlled by said last mentioned means to regulate the supply of fuel to the combustion chamber.

5. A control system for controlling the supply of fuel to the combustion chamber of an oil heater in primary response to the exit oil temperature and in secondary response to the rate of changes occurring in the combustion chamber temperature comprising a thermocouple arranged to respond to the variations in temperature of the exit oil temperature of said oil heater to derive a voltage varying according to the variations in magnitude of said exit oil temperature, a second thermocouple arranged to respond to the variations in temperature occurring in the combustion chamber, solely electrical means connected in circuit with said second mentioned thermocouple to modify the voltage output of the latter as required to derive from said second thermocouple a voltage varying only according to the rate of change of said second variable condition, means responsive to the voltages derived from both of said thermocouples, and means controlled by said last mentioned means to effect a regulation of the supply of fuel to said combustion chamber jointly dependent upon the magnitude of the exit oil temperature and upon the rate of change the combustion chamber temperature.

6. In a control system, a thermocouple arranged to respond to the variations in temperature of a variable temperature the magnitude of which is affected after some delay by variations in a second variable temperature, a second thermocouple arranged to respond to the variations in said second variable temperature and having one terminal connected to one terminal of the first mentioned thermocouple, a condenser having one terminal connected to the second terminal of said second thermocouple, a resistor connecting the second terminal of said condenser to the first terminal of said second thermocouple, and means connected between the second terminal of the first thermocouple and the second terminal of said condenser to produce a control effect on said first mentioned variable temperature jointly dependent upon the magnitude of said first mentioned variable temperature and upon the rate of change of said second variable temperature.

7. In a control system for controlling the magnitude of a variable temperature, control means therefor jointly responsive to the magnitude of a variable temperature to be controlled and to the rate of change of a second variable temperature which operates after some delay to affect the magnitude of said first mentioned variable temperature comprising a thermocouple arranged to respond to the variations in temperature of said first mentioned variable temperature, a second thermocouple arranged to respond to the variations in the second mentioned variable temperature and having one terminal connected to one terminal of the first mentioned thermocouple, a condenser having one terminal connected to the second terminal of said second thermocouple, a resistor connecting the second terminal of said condenser to the first terminal of said second thermocouple, means responsive to the voltage difference between the second terminal of the first thermocouple and the second terminal of said condenser, and means controlled by said last mentioned means to produce a control effect on said first variable temperature.

8. In a control system, an element jointly responsive to a variable temperature and to the rate of change of a temperature comprising a thermocouple, a condenser having one terminal connected to one terminal of said thermocouple, a resistor connecting the second terminal of the condenser to the second terminal of the thermocouple, a second thermocouple having one terminal connected to said second terminal of the first mentioned thermocouple, a variable source of known voltage, means to oppose the unknown voltage between the second terminal of the second thermocouple and the second terminal of said condenser to said source of known voltage, means responsive to the difference between said voltages, and means controlled by said last mentioned means to regulate the magnitude of said variable temperature and to adjust said known source of voltage to reduce the difference between said opposed voltages.

9. In a control system, thermoelectric means to produce a voltage varying according to the variations in magnitude of a variable temperature, solely electrical reactance means having a substantial voltage modifying property connected in circuit with said thermoelectric means to derive a voltage varying according to the rate of change of a variable temperature, a variable source of known voltage, means to oppose the resultant of said first two voltages to said source of known voltage, means responsive to the difference of said opposed voltages, and means controlled by said last mentioned means to regulate the magnitude of said variable temperature and to adjust said known source of voltage to reduce the difference between said opposed voltages.

10. In a control system, voltage producing means to produce a voltage varying according to the variations in magnitude of a variable condition, solely electrical reactance means having a substantial voltage modifying property connected in circuit with said voltage producing means to derive a voltage varying according to the rate of change of a variable condition, a variable source of known voltage, means to oppose the resultant of said first two voltages to said source of unknown voltage, means responsive to the difference of said opposed voltages, and means controlled by said last mentioned means to regulate the magnitude of said variable condition and to adjust said known source of voltage to reduce the difference between said opposed voltages.

11. An element responsive to the rate of change of a temperature comprising a thermocouple and means permitting or preventing current flow through said thermocouple accordingly as its temperature is changing or stationary comprising a condenser having one terminal connected to one terminal of said thermocouple, and a resistor connecting the second terminal of the condenser to the second terminal of the thermocouple, whereby a change in the temperature of said thermocouple produces a potential difference between the ends of said resistor which depends upon and varies with the rate at which said temperature change occurs.

12. Means responsive to the rate of change of a temperature comprising a thermocouple and means permitting or preventing current flow through said thermocouple accordingly as its temperature is changing or stationary comprising a condenser having one terminal connected to one terminal of said thermocouple, and a resistor connecting the second terminal of the condenser to the second terminal of the thermocouple, whereby a change in the temperature of said thermocouple produces a potential difference between the ends of said resistor which depends upon and varies with the rate at which said temperature change occurs, and means responsive to the potential difference between said second terminals.

13. An element jointly responsive to a variable temperature and to the rate of change of a temperature comprising a thermocouple, a condenser having one terminal connected to one terminal of said thermocouple, a resistor connecting the second terminal of the condenser to the second terminal of said thermocouple, and a second thermocouple having one terminal connected to said second terminal of the first mentioned thermocouple.

14. Means jointly responsive to a variable temperature and to the rate of change of a temperature comprising a thermocouple and means permitting or preventing current flow through said thermocouple accordingly as its temperature is changing or stationary comprising a condenser having one terminal connected to one terminal of said thermocouple and a resistor connecting the second terminal of the condenser to the second terminal of the thermocouple, a second thermocouple having one terminal connected to said second terminal of the first mentioned thermocouple, whereby a change in the temperature of said thermocouple produces a potential drop in said resistor which depends upon and varies with the rate at which said temperature change occurs and produces a change in the voltage of said second thermocouple which depends upon and varies with the magnitude of said temperature change and means responsive to the voltage difference between the second terminal of the second thermocouple and the second terminal of said condenser.

15. An element jointly responsive to a variable temperature and to the rate of a change of a temperature comprising a thermocouple, a condenser having one terminal connected to one terminal of said thermocouple, a resistor connecting the second terminal of the condenser to the second terminal of said thermocouple, a contact adjustable along the length of said resistor, and a second thermocouple having one terminal connected to said second terminal of the first mentioned thermocouple.

16. Means jointly responsive to a variable temperature and to the rate of change of a temperature comprising a thermocouple and means permitting or preventing current flow through said thermocouple accordingly as its temperature is changing or stationary comprising a condenser having one terminal connected to one terminal of said thermocouple and a resistor connecting the second terminal of the condenser to the second terminal of the thermocouple, a contact adjustable along the length of said resistor, a second thermocouple having one terminal connected to said second terminal of the first mentioned thermocouple, whereby a change in the temperature of said thermocouple produces a potential drop in said resistor which depends upon and varies with the rate at which said temperature change occurs and produces a change in the voltage of said second thermocouple which depends upon and varies with the magnitude of said temperature change and means responsive to the voltage difference between said contact and the second terminal of the second thermocouple.

17. A furnace control system including a furnace work chamber, heat supply means for said chamber, work within said chamber to be heated, means within said chamber responsive to the rate of change and the magnitude of temperature therein comprising a thermocouple, a condenser having one terminal connected to one terminal of said thermocouple, a resistor connecting the second terminal of the condenser to the second terminal of the thermocouple, a second thermocouple having one terminal connected to said second terminal of the first mentioned thermocouple, and means responsive to the voltage difference between the second terminal of the second thermocouple and the second terminal of said condenser to control said heat supply means.

18. A furnace control system including a furnace work chamber, means to supply fuel to said chamber for combustion therein, work within said chamber to be heated, a thermocouple arranged to respond to variations in temperature in a locality within said chamber, a condenser having one terminal connected to one terminal of said thermocouple, a resistor connecting the second terminal of the condenser to the second terminal of the thermocouple, a second thermocouple arranged to respond to variations in temperature in another locality within said chamber and having one terminal connected to said second terminal of the first mentioned thermocouple, and means responsive to the voltage difference between the second terminal of the second thermocouple and the second terminal of the condenser to control said fuel supply means.

19. A furnace control system including a furnace work chamber, heat supply means for said chamber, work within said chamber to be heated, a thermocouple arranged to respond to variations in temperature of said heat supply means, a condenser having one terminal connected to one terminal of said thermocouple, a resistor connecting the second terminal of the condenser to the second terminal of the thermocouple, a second thermocouple arranged to respond to variations in temperature of said work and having one terminal connected to said second terminal of the first mentioned thermocouple, and means responsive to the voltage difference between the second terminal of the second thermocouple and the second terminal of said condenser to control said heat supply means.

20. A furnace control system including a furnace work chamber, electric means including a resistor for heating said chamber, means to gradually vary the action of said electric means in heating said chamber, work within said chamber to be heated, a thermocouple arranged to respond to variations in temperature of said resistor, a condenser having one terminal connected to one terminal of said thermocouple, a resistor connecting the second terminal of the condenser to the second terminal of the thermocouple, a second thermocouple arranged to respond to variations in temperature of said work and having one terminal connected to said second terminal of the first mentioned thermocouple, and means responsive to the voltage difference between the second terminal of the second thermocouple and the second terminal of said condenser to control said second mentioned means.

WALTER P. WILLS.